(12) United States Patent
Merkel et al.

(10) Patent No.: US 9,236,816 B2
(45) Date of Patent: Jan. 12, 2016

(54) METHOD FOR STARTING A SYNCHRONOUS MACHINE

(75) Inventors: Tino Merkel, Schwieberdingen (DE); Hans-Peter Groeter, Vaihingen (DE); Gunther Goetting, Stuttgart (DE); Georg Schneider, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 821 days.

(21) Appl. No.: 13/516,148

(22) PCT Filed: Nov. 3, 2010

(86) PCT No.: PCT/EP2010/066680
§ 371 (c)(1),
(2), (4) Date: Sep. 12, 2012

(87) PCT Pub. No.: WO2011/082859
PCT Pub. Date: Jul. 14, 2011

(65) Prior Publication Data
US 2013/0057185 A1 Mar. 7, 2013

(30) Foreign Application Priority Data
Dec. 17, 2009 (DE) .......................... 10 2009 054 851

(51) Int. Cl.
*H02P 6/04* (2006.01)
*H02P 1/46* (2006.01)
*H02P 1/52* (2006.01)

(52) U.S. Cl.
CPC ... *H02P 1/46* (2013.01); *H02P 1/52* (2013.01)

(58) Field of Classification Search
CPC ..... B60W 10/06; B60W 10/08; B60W 10/02; B60W 20/40; Y10S 903/93
See application file for complete search history.

(56) References Cited

U.S. PATENT DOCUMENTS

| | | | | |
|---|---|---|---|---|
| 4,225,007 | A * | 9/1980 | Voges | 180/284 |
| 2002/0039950 | A1 * | 4/2002 | Graf et al. | 477/107 |
| 2006/0218896 | A1 * | 10/2006 | Ando et al. | 60/277 |
| 2007/0170880 | A1 | 7/2007 | Shahi et al. | |
| 2009/0259391 | A1 | 10/2009 | Ando et al. | |
| 2010/0066281 | A1 * | 3/2010 | Hahle et al. | 318/380 |

FOREIGN PATENT DOCUMENTS

| | | |
|---|---|---|
| CN | 1479965 | 3/2004 |
| CN | 1960161 | 5/2007 |
| CN | 101267971 | 9/2008 |
| CN | 101286724 | 10/2008 |
| JP | 58-145096 | 9/1983 |
| JP | 60-174080 | 9/1985 |
| JP | 11-187700 | 7/1999 |
| JP | 2007-126097 | 5/2007 |

OTHER PUBLICATIONS

International Search Report for PCT/EP2010/066680, dated Apr. 17, 2012.

* cited by examiner

*Primary Examiner* — Kawing Chan
*Assistant Examiner* — Zoheb Imtiaz
(74) *Attorney, Agent, or Firm* — Kenyon & Kenyon LLP

(57) ABSTRACT

In a method for starting a synchronous machine, a default torque is predefined, and a rotational speed of the synchronous machine is adjusted after starting. A torque which is higher than the default torque is predefined, and the higher torque is reduced in the subsequent second step to a positive value which is less than the default torque, and is increased to the default torque in a third step.

13 Claims, 6 Drawing Sheets

METHOD FOR STARTING A SYNCHRONOUS MACHINE

BACKGROUND OF THE INVENTION

1. Field of the Invention

The present invention relates to a method for starting a synchronous machine.

2. Description of the Related Art

Various methods are known, for example from published U.S. Patent Application Publication US 2007/0170880 A1, for controlling electric machines, for example permanent-magnet synchronous machines. The control of electric machines requires a knowledge as accurate as possible of the rotor position of the electric machine, which may be ascertained by using a digital sensor system, for example.

When a digital sensor system is used, it is disadvantageous that only an approximate position of the rotor may be estimated at a standstill. At very low rotational speeds, in particular for dynamic acceleration processes, it is not possible to adequately estimate the rotor position for good current control and torque control due to the time interval between two digital sensor signals. As a result, use of a digital sensor system for determining the rotor position with an acceptable level of convenience is possible only for drive trains having a sliding clutch or a hydraulic converter between the electric machine and the wheels of the vehicle. In particular for drive trains having a low gear ratio of the electric machine with respect to the wheel, the currently existing control problems in the form of torque surges and noise generation are very noticeable.

BRIEF SUMMARY OF THE INVENTION

One aspect of the present invention has the advantage that it represents a strategy for comfortable, jerk-free, and reliable starting of a synchronous machine from a standstill, and thus represents an extension of the field of application of a digital sensor system for hybrid and electric vehicles to applications having direct engagement with the wheels. This is achieved according to the present invention in that a default torque M_V1 is predefined and a rotational speed of the synchronous machine is adjusted after starting, in that a torque M_H1 which is higher than default torque M_V1 is predefined in a first step, and torque M_H1 is reduced to default torque M_V1 in a second step. Due to higher torque M_H1 which is predefined in the first method step, the increase in rotational speed is initially greater in order to overcome play or slack in the drive train, and to compensate for the elasticity of the drive train components in the transmission and axle shafts as quickly as possible, and to transmit torque to the wheels. In particular, higher torque M_H1 is reduced to default torque M_V1 in the second method step in such a way that no mechanical vibrations are induced during the tensioning of the drive train. The drive train remains tensioned during the reduction of higher torque M_H1 to default torque M_V1, as the result of which torque is transmitted to the wheels, and the rotational speed continuously increases.

Another aspect of the present invention has the advantage that it represents a strategy for comfortable, jerk-free, and reliable starting of a synchronous machine from a standstill, and thus represents an extension of the field of application of a digital sensor system for hybrid and electric vehicles to applications having direct engagement with the wheels. This is achieved according to the present invention in that a default torque M_V1 is predefined and a rotational speed of the synchronous machine is adjusted after starting, in that a torque M_H1 which is higher than default torque M_V1 is predefined in a first step, and torque M_H1 is reduced in a second step to a positive value M_H1a which is less than default torque M_V1 and, in a third step, torque M_H1a is increased to default torque M_V1. Due to higher torque M_H1 which is predefined in the first method step, the increase in rotational speed is initially greater in order to overcome play or slack in the drive train, and to compensate for the elasticity of the drive train components in the transmission and axle shafts as quickly as possible, and to transmit torque to the wheels. In particular, higher torque M_H1 is reduced in the second method step to a positive value M_H1a which is less than default torque M_V1 in such a way that no mechanical vibrations are induced during the tensioning of the drive train. The tensioning of the drive train is temporarily eliminated during the reduction, described in the second method step, of higher torque M_H1 to a positive value M_H1a which is less than default torque M_V1, as the result of which no torque is transmitted to the wheels, and the rotational speed remains constant. The increase in torque M_H1a to default torque M_V1 described in the third method step results in increased tensioning of the drive train, as the result of which torque is once again transmitted to the wheels, and the rotational speed continuously increases.

The method according to the present invention for starting the synchronous machine may advantageously be applied to a synchronous machine which is at a standstill, as well as to a synchronous machine which has a rotational speed that is less than a threshold value, the threshold value depending on the number of pole pairs of the particular synchronous machine.

If a synchronous machine has already been started and is subsequently braked, the braking operation may be carried out until the synchronous machine comes to a standstill. However, it is also possible that the synchronous machine must be restarted shortly before reaching a standstill, so that the standstill is not reached.

The position of the rotor at the standstill is known only with relatively little accuracy. A defined starting position is advantageously specified for the rotor before starting the synchronous machine in order to avoid operation in an unstable range. Therefore, the stator current is increased over time and brought to a maximum value before the first method step is carried out. Due to the increase in current, the rotor may be aligned with the magnetic field of the stator which is generated by the stator current.

After the latter-mentioned method step has been carried out, the rotational speed curve advantageously increases in proportion to default torque M_V1, since the drive train is sufficiently tensioned due to the mentioned method step, and therefore it is not possible for torque surges to occur or mechanical vibrations to be induced.

Any arbitrary default torque may be predefined before a synchronous machine is started. For each of these predefined default torques, the synchronous machine is started in the first method step with a torque which is higher than the particular default torque. Assuming that M_V1 is the default torque of a first starting operation, the synchronous machine is started in the first method step with higher torque M_H1 relative to M_V1. Assuming that M_V2 is the default torque of a second starting operation, the synchronous machine is started in the first method step with higher torque M_H2 relative to M_V2. If M_V1 is greater than or equal to M_V2, M_H1 is advantageously greater than or equal to M_H2. Thus, if a default torque M_V1 which is higher than default torque M_V2 is predefined, the starting operation is advantageously carried out at a higher torque M_H1 and a resulting greater tensioning of the drive train than is the case for a lower default torque M_V2, with resulting torque M_H2 for the starting operation. Since M_H2 is less than or equal to M_H1, M_H2 results in less tensioning of the drive train than is the case for M_H1.

With the aid of the method steps according to the present invention, it is possible to extend the field of application of a digital sensor system for hybrid and electric vehicles to drives having direct engagement with the wheels, as is the case for electric axles, dual-clutch transmissions (DCT), or automatic transmissions, for example. A digital sensor system is thus advantageously used for determining the position of the rotor of the synchronous machine. The digital sensor system is a proven, robust sensor system having a high degree of freedom with regard to installation.

DETAILED DESCRIPTION OF THE INVENTION

Figure 1:
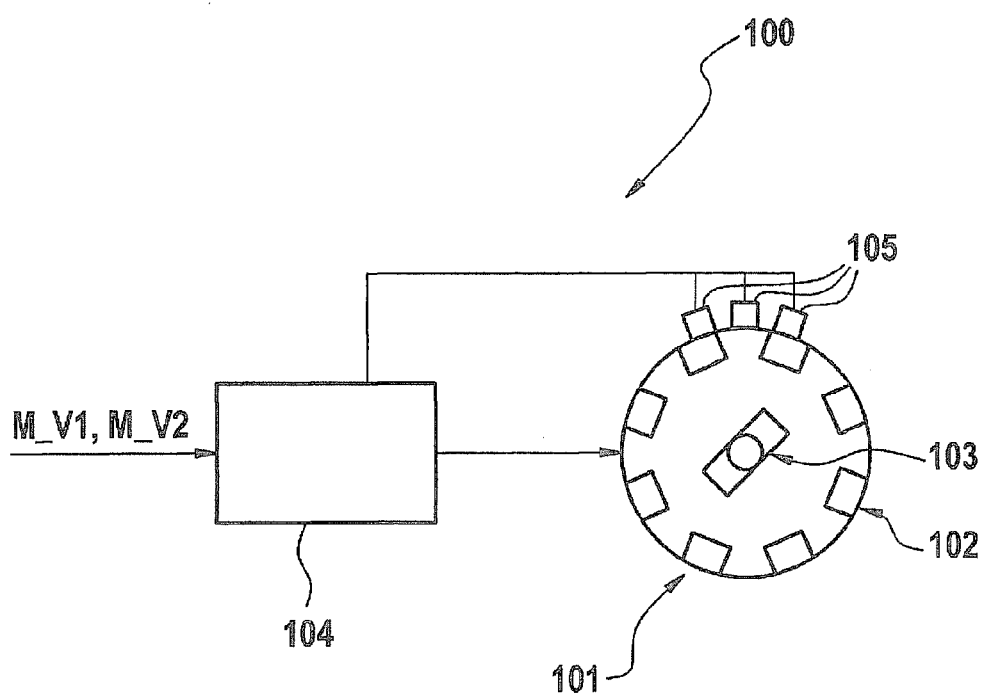
FIG. 1 illustrates a schematic view of a synchronous machine system.

FIG. 1 schematically shows a synchronous machine system 100.

Synchronous machine system 100 is composed of a synchronous machine 101 and associated control unit 104. Synchronous machine 101 shown in FIG. 1 has a stationary component (stator) 102 and a rotating component (rotor) 103. A default torque M_V1 is externally supplied to control unit 104. Digital sensor system 105 is used to detect the rotor position.

Figure 2:
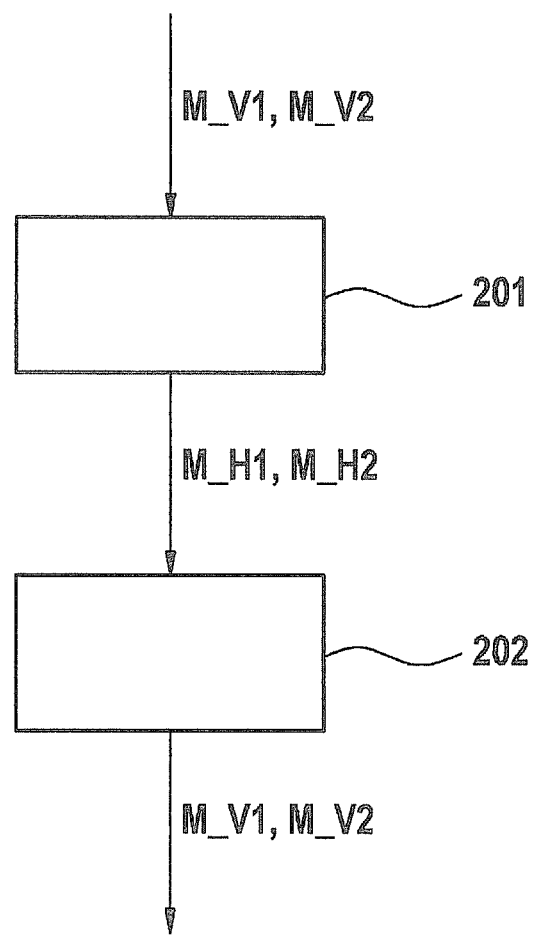
FIG. 2 shows a block diagram of a first starting variant of the synchronous machine.

FIG. 2 shows a block diagram of a first exemplary embodiment of the present invention. Starting from the vehicle standstill, a controlled start of the synchronous machine and the transition into the established controlled operation are possible with the aid of the method described below. The position of the rotor at the standstill is known only with relatively little accuracy. To specify a defined starting position for the rotor and to ensure operation in a stable range, the stator current is initially brought to a selected maximum value, causing the rotor to align with the magnetic field which is generated by the stator current. Reliable information concerning the rotor position is not yet known from the previous signal evaluation. The digital sensor system generally does not deliver adequate signals for a sufficiently accurate computation of the rotor position until reaching a rotational speed of approximately 100 rpm, in order to make a transition into the conventional field-oriented torque-controlled operation. If a default torque M_V1 is present, according to the present invention synchronous machine 101 is started in a first step 201 with a torque M_H1 which is higher than default torque M_V1. Due to higher torque M_H1, the increase in rotational speed is initially greater in order to overcome play or slack in the drive train, and to compensate for the elasticity of the drive train components in the transmission and axle shafts as quickly as possible, and to transmit torque to the wheels. As the result of higher torque M_H1, the resulting rotational speed curve is predefined in such a way that no mechanical vibrations are induced during the tensioning of the drive train. Higher torque M_H1 is subsequently reduced to default torque M_V1 in a second step 202.

If a default torque M_V2 which is less than or equal to M_V1 is predefined, synchronous machine 101 is started in a first step 201 at a higher torque M_H2 which is less than or equal to M_H1. If M_V1 is equal to M_V2, M_H1 is equal to M_H2. If M_V2 is less than M_V1, M_H2 is less than M_H1. M_H2 is subsequently reduced to default torque M_V2 in a second step 202.

Figure 3:
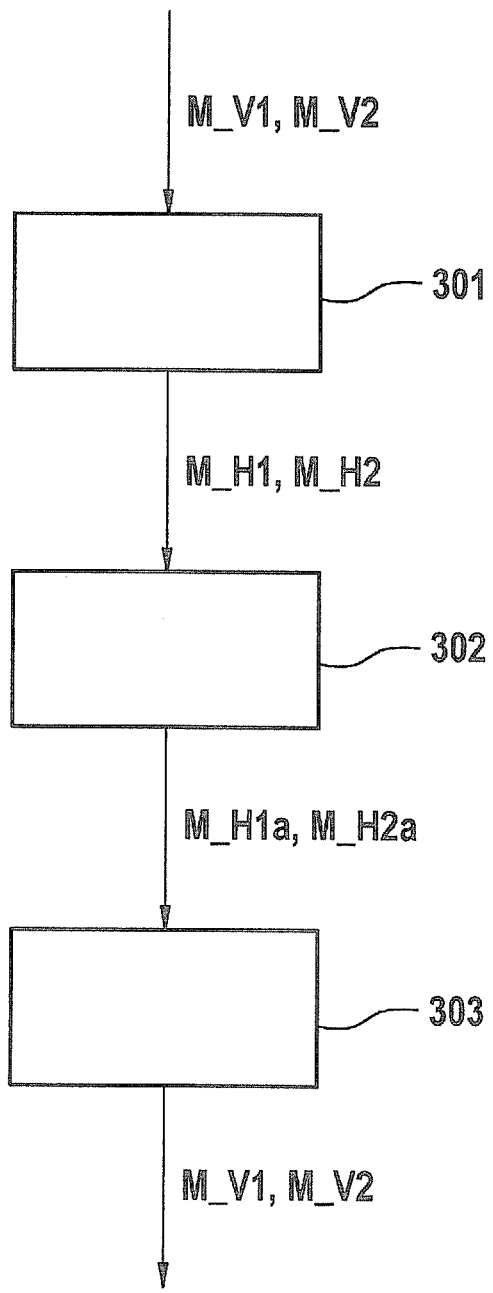
FIG. 3 illustrates another block diagram of a second starting variant of the synchronous machine.

FIG. 3 shows a block diagram of a second exemplary embodiment of the present invention. Starting from the vehicle standstill, a controlled start of the synchronous machine and the transition into the established controlled operation are possible with the aid of the method described below. The position of the rotor at the standstill is known only with relatively little accuracy. To specify a defined starting position for the rotor and to ensure operation in a stable range, the stator current is initially brought to a selected maximum value, causing the rotor to align with the magnetic field which is generated by the stator current. Reliable information concerning the rotor position is not yet known from the previous signal evaluation. The digital sensor system, as a position detection device which uses multiple, for example three, Hall sensors, generally does not deliver adequate signals for a sufficiently accurate computation of the rotor position until reaching a rotational speed of approximately 100 rpm, in order to make a transition into the conventional field-oriented torque-controlled operation. If a default torque M_V1 is present, according to the present invention synchronous machine 101 is started in a first step 301 with a torque M_H1 which is higher than default torque M_V1. Due to higher torque M_H1, the increase in rotational speed is initially greater in order to overcome play or slack in the drive train, and to compensate for the elasticity of the drive train components in the transmission and axle shafts as quickly as possible, and to transmit torque to the wheels. As the result of higher torque M_H1, the resulting rotational speed curve is predefined in such a way that no mechanical vibrations are induced during the tensioning of the drive train. Higher torque M_H1 is reduced in a second step 302 to a positive value M_H1a which is less than default torque M_V1. Torque M_H1a is subsequently reduced to default torque M_V1 in a third step 303.

If a default torque M_V2 which is less than or equal to M_V1 is predefined, synchronous machine 101 is started in a first step 301 with a torque M_H2 which is higher than default torque M_V2, M_H2 being less than or equal to M_H1. If M_V1 is equal to M_V2, M_H1 is equal to M_H2. If M_V2 is less than M_V1, M_H2 is less than M_H1. M_H2 is subsequently reduced in a second step 302 to a positive value M_H2a which is less than default torque M_V2. Torque M_H1a is subsequently reduced to default torque M_V2 in a third step 303.

Figure 4:
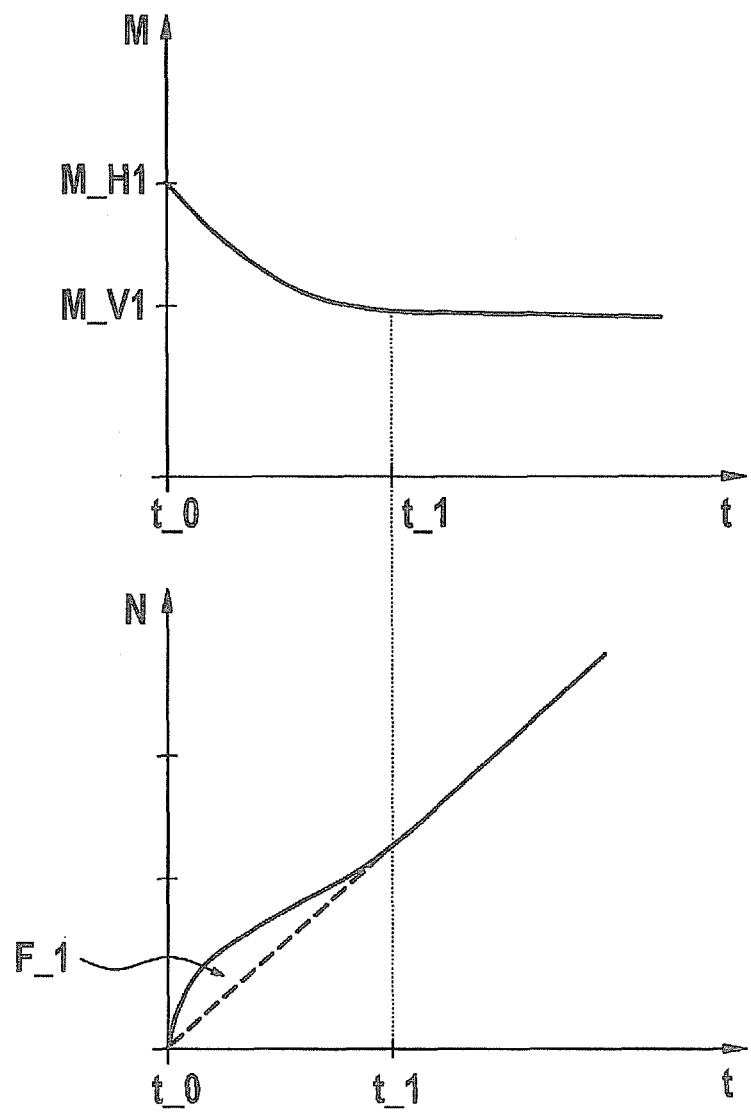
FIG. 4 shows a schematic illustration of one possible torque curve according to the present invention and the associated rotational speed curve.

In the top graph, FIG. 4 shows a schematic illustration of one possible torque curve, torque M being plotted as a function of time t. The bottom graph in FIG. 4 illustrates the associated rotational speed curve, rotational speed N being plotted as a function of time t. Since the position of the rotor at the standstill of the synchronous machine is known only with relatively little accuracy, the stator current is initially brought to a selected maximum value prior to point in time t_0, causing the rotor to align with the magnetic field which is generated by the stator current. If a default torque M_V1 is present, according to the present invention synchronous machine 101 is started in a first step 201 with a torque M_H1 which is higher than default torque M_V1. If the synchronous machine had been started at default torque M_V1, the linear rotational speed curve represented by the dashed line in the curve shown in the bottom graph would be expected. Due to torque M_H1 according to the present invention which is higher than default torque M_V1, the increase in rotational speed is initially greater, and up to point in time t_1 has a nonlinear curve, as illustrated by the solid line in the bottom diagram in FIG. 4. In this way, play in the drive train may be overcome more quickly, and elasticities of the drive train components in the transmission and axle shafts may be compensated for as quickly as possible. The rotational speed curve is a function of the magnitude of default torque M_V1. According to the present invention, higher torque M_H1 is subsequently reduced in a second step 202 to default torque M_V1 until point in time t_1. The slope of the resulting rotational speed curve consistently remains positive due to reducing higher torque M_H1 to default torque M_V1. The rotational speed increases linearly after point in time t_1, the slope of the rotational speed curve in the linear range being proportional to the setpoint torque. Area F_1, which is enclosed between the solid-line nonlinear curve and the dashed-line linear curve in the time interval between t_0 and t_1, is likewise proportional to default torque M_V1, and corresponds to the mechanical torsional angle of the drive train between the rotor and the wheel.

Figure 5:
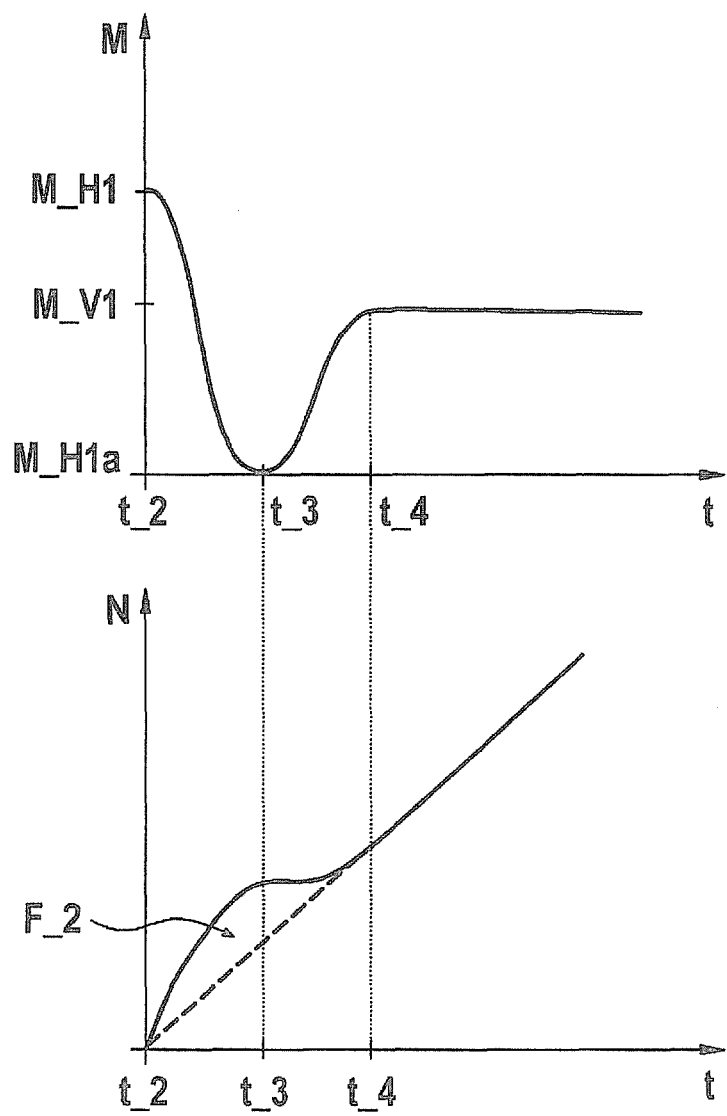
FIG. 5 schematically illustrates one possible torque curve according to the present invention and the associated rotational speed curve.

The top graph in FIG. 5 shows a schematic illustration of one possible torque curve, torque M being plotted as a function of time t. The bottom graph in FIG. 5 illustrates the associated rotational speed curve, rotational speed N being plotted as a function of time t. Since the position of the rotor at the standstill of the synchronous machine is known only with relatively little accuracy, the stator current is initially brought to a selected maximum value prior to point in time t_2, causing the rotor to align with the magnetic field which is generated by the stator current. If a default torque M_V1 is present, according to the present invention synchronous machine 101 is started in a first step 301 with a torque M_H1 which is higher than default torque M_V1. If the synchronous machine had been started at default torque M_V1, the linear rotational speed curve represented by the dashed line in the curve shown in the bottom graph would be expected. Due to torque M_H1 according to the present invention which is higher than default torque M_V1, the increase in rotational speed is initially greater, and up to point in time t_3 has a nonlinear curve, as illustrated by the solid line in the bottom diagram in FIG. 5. In this way, play in the drive train may be overcome more quickly, and elasticities of the drive train components in the transmission and axle shafts may be compensated for as quickly as possible. The rotational speed curve is a function of the magnitude of default torque M_V1. According to the present invention, higher torque M_H1 is subsequently reduced in a second step 302 to a positive value M_H1a which is less than default torque M_V1 until point in time t_3. The slope of the resulting rotational speed curve consistently remains positive or is equal to zero due to reducing higher torque M_H1 to torque M_H1a, as the result of which the rotational speed continuously increases or temporarily remains constant. After M_H1a is increased to default torque M_V1 until point in time t_4.

The rotational speed increases linearly after point in time t_4, the slope of the rotational speed curve in the linear range being proportional to the setpoint torque. Area F_2, which is enclosed between the solid-line nonlinear curve and the dashed-line linear curve in the time interval between t_2 and t_4, is likewise proportional to default torque M_V1, and corresponds to the mechanical torsional angle of the drive train between the rotor and the wheel.

Figure 6:
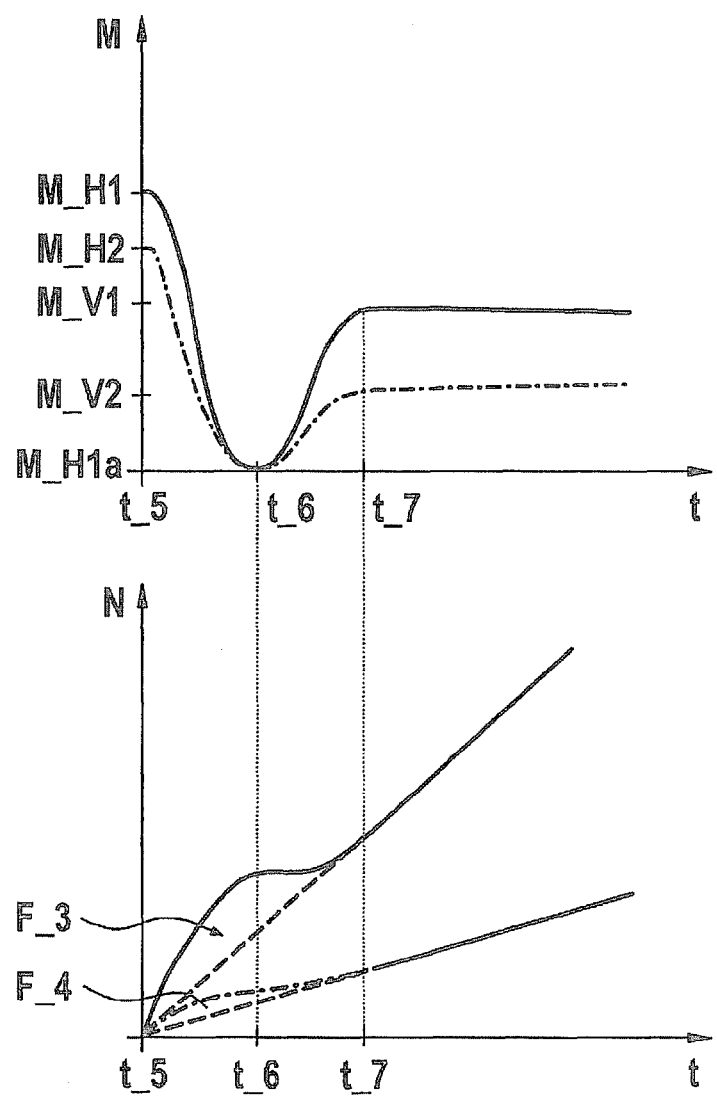
FIG. 6 schematically shows two different torque curves and their associated rotational speed curves.

The top graph in FIG. 6 shows a schematic illustration of two possible torque curves, torque M being plotted as a function of time t. The lower graph in FIG. 6 illustrates the associated rotational speed curve, rotational speed N being plotted as a function of time t. If a default torque M_V1 is present, according to the present invention synchronous machine 101 is started in a first step 301 with a torque M_H1 which is higher than default torque M_V1. Due to torque M_H1 according to the present invention which is higher than default torque M_V1, the increase in rotational speed is initially greater, and has a curve as illustrated by the solid line in the bottom diagram in FIG. 6. If a default torque M_V2 which is less than M_V1 is present, according to the present invention synchronous machine 101 is started in a first step 301 with a torque M_H2 which is higher than default torque M_V2, M_H2 being less than M_H1. Due to torque M_H2 according to the present invention which is higher than default torque M_V2, the increase in rotational speed is initially greater, and has a curve as illustrated by the dash/dotted line in the bottom diagram in FIG. 6.

Area F_3, which is enclosed between the nonlinear solid-line rotational speed curve and the dashed-line linear curve therebeneath in the time interval between t_5 and t_7, is proportional to default torque M_V1, and corresponds to the mechanical torsional angle of the drive train between the rotor and the wheel. Area F_4, which is enclosed between the nonlinear dash/dotted-line rotational speed curve and the dashed-line linear curve therebeneath in the time interval between t_5 and t_7, is proportional to default torque M_V2, and corresponds to the mechanical torsional angle of the drive train between the rotor and the wheel. If M_V1 is greater than or equal to M_V2 and M_H1 is greater than or equal to M_H2, area F_3 greater than or equal to area F_4.

What is claimed is:

1. A method for starting a synchronous machine having a stator, a rotor, and a default torque, the method comprising:
    bringing a stator current of the synchronous machine, which is at a standstill, to a selected value prior to predefining a torque which is higher than the default torque or reducing the torque to the default torque, so as to cause the rotor to align with the magnetic field which is generated by the stator current;
    Predefining the torque of the synchronous machine which is higher than the default torque;
    adjusting a rotational speed and the corresponding torque of the synchronous machine after starting, wherein the torque is initially reduced to a positive value which is less than the default torque, and subsequently increased to the default torque;
    wherein a digital sensor system is used for determining a position of the rotor of the synchronous machine, and
    wherein a transition is made from a controlled start to a field-oriented torque-controlled operation.

2. A method for starting a synchronous machine having a stator and a rotor, the method comprising:
    predefining a default torque of the synchronous machine;
    predefining a second torque of the synchronous machine which is higher than the default torque; and
    adjusting a rotational speed and a corresponding torque of the synchronous machine after starting, wherein the second torque is initially reduced to a positive value which is less than the default torque, and subsequently increased to the default torque.

3. The method as recited in claim 2, wherein, prior to predefining the second torque which is higher than the default torque, the synchronous machine one of (i) is at a standstill or (ii) has a rotational speed which is less than a threshold value.

4. The method as recited in claim 3, wherein, prior to predefining the second torque which is higher than the default torque, the synchronous machine is at a standstill, and the synchronous machine is brought to a selected maximum value, causing the rotor to align with the magnetic field which is generated by the stator current.

5. The method as recited in claim 3, wherein an increase in a rotational speed curve is proportional to the default torque after the second torque is increased to the default torque.

6. The method as recited in claim 2, wherein the default torque and the associated second torque for a selected first starting operation condition differs from the default torque and the associated second torque for a selected second starting operation condition in such a way that (i) in the case the default torque for the selected first starting operation condition is greater than the default torque for the selected second starting operation condition, then the second torque for the selected first starting operation condition is greater than the second torque for the selected second starting operation condition, and (ii) in the case the default torque for the selected first starting operation condition is less than the default torque for the selected second starting operation condition, then the second torque for the selected first starting operation condition is less than the second torque for the selected second starting operation condition.

7. A control unit for operating a synchronous machine having a stator and a rotor, the control unit comprising:
a default torque predefining arrangement for predefining a default torque of the synchronous machine;
a second torque predefining arrangement for predefining a second torque of the synchronous machine which is higher than the default torque; and
an adjusting arrangement for adjusting a rotational speed and a corresponding torque of the synchronous machine after starting, wherein the second torque is initially reduced to a positive value which is less than the default torque, and subsequently increased to the default torque.

8. The control unit as recited in claim 7, wherein, prior to predefining the second torque which is higher than the default torque, the synchronous machine one of (i) is at a standstill or (ii) has a rotational speed which is less than a threshold value.

9. The control unit as recited in claim 8, wherein, prior to predefining the second torque which is higher than the default torque, the synchronous machine is at a standstill, and the synchronous machine is brought to a selected maximum value, causing the rotor to align with the magnetic field which is generated by the stator current.

10. The control unit as recited in claim 8, wherein an increase in a rotational speed curve is proportional to the default torque after the second torque is increased to the default torque.

11. The control unit as recited in claim 7, wherein the default torque and the associated second torque for a selected first starting operation condition differs from the default torque and the associated second torque for a selected second starting operation condition in such a way that (i) in the case the default torque for the selected first starting operation condition is greater than the default torque for the selected second starting operation condition, then the second torque for the selected first starting operation condition is greater than the second torque for the selected second starting operation condition, and (ii) in the case the default torque for the selected first starting operation condition is less than the default torque for the selected second starting operation condition, then the second torque for the selected first starting operation condition is less than the second torque for the selected second starting operation condition.

12. A method for starting a synchronous machine having a stator, a rotor, and a default torque, the method comprising:
bringing a stator current of the synchronous machine, which is at a standstill, to a selected value prior to predefining a torque which is higher than the default torque or reducing the torque to the default torque, so as to cause the rotor to align with the magnetic field which is generated by the stator current;
predefining the torque of the synchronous machine which is higher than the default torque; adjusting a rotational speed of the synchronous machine after starting,
wherein the torque is initially reduced to a positive value which is less than the default torque, and subsequently increased to the default torque;
wherein a digital sensor system is used for determining a position of the rotor of the synchronous machine, and
wherein a transition is made from a controlled start to a field-oriented torque-controlled operation.

13. A control unit for operating a synchronous machine having a stator, a rotor, and a default torque, the control unit comprising:
an arrangement to bring a stator current of the synchronous machine, which is at a standstill, to a selected value prior to predefining a torque which is higher than the default torque or reducing the torque to the default torque, so as to cause the rotor to align with the magnetic field which is generated by the stator current;
the torque predefining arrangement for predefining the torque of the synchronous machine which is higher than the default torque;
an adjusting arrangement for adjusting a rotational speed and corresponding torque of the synchronous machine after starting, wherein the second torque is initially reduced to a positive value which is less than the default torque, and subsequently increased to the default torque; and a digital sensor system for determining a position of the rotor of the synchronous machine; wherein a transition is made from a controlled start to a field-oriented torque-controlled operation.

* * * * *